US008523977B2

(12) United States Patent
Panda et al.

(10) Patent No.: US 8,523,977 B2
(45) Date of Patent: Sep. 3, 2013

(54) METHOD OF DESULFURIZING STEEL

(75) Inventors: Dhiren Panda, Blytheville, AR (US);
Neal Ross, Armorel, AR (US); Gary McQuillis, Blytheville, AR (US);
Jerome Jenkins, Blytheville, AR (US)

(73) Assignee: Nucor Corporation, Charlotte, NC (US)

( * ) Notice: Subject to any disclaimer, the term of this patent is extended or adjusted under 35 U.S.C. 154(b) by 292 days.

(21) Appl. No.: 13/106,352

(22) Filed: May 12, 2011

(65) Prior Publication Data

US 2012/0180601 A1    Jul. 19, 2012

Related U.S. Application Data

(63) Continuation-in-part of application No. 13/007,163, filed on Jan. 14, 2011, now abandoned.

(51) Int. Cl.
*C21C 5/36* (2006.01)
*C21C 7/10* (2006.01)

(52) U.S. Cl.
USPC ............... 75/508; 75/512; 75/560; 75/583; 65/19

(58) Field of Classification Search
USPC ............... 75/508, 512, 560, 583; 65/19
See application file for complete search history.

(56) References Cited

U.S. PATENT DOCUMENTS

| 3,793,000 | A | 2/1974 | Miltenberger | |
|---|---|---|---|---|
| 3,888,294 | A | 6/1975 | Fastner et al. | |
| 4,043,798 | A | 8/1977 | Nashiwa et al. | |
| 4,054,445 | A | 10/1977 | Ramacciotti | |
| 4,152,140 | A | 5/1979 | Hori et al. | |
| 4,612,043 | A | 9/1986 | Gray et al. | |
| 5,110,351 | A | 5/1992 | Hunter et al. | |
| 5,228,902 | A | 7/1993 | Bogan et al. | |
| 5,304,231 | A * | 4/1994 | Kato et al. | 75/528 |
| 5,413,623 | A | 5/1995 | Oonuki et al. | |
| 5,472,479 | A * | 12/1995 | Ahlborg | 75/508 |
| 5,520,718 | A | 5/1996 | Keilman et al. | |
| 5,851,262 | A | 12/1998 | Mukai | |
| 8,105,415 | B2 * | 1/2012 | McQuillis et al. | 75/508 |
| 8,313,553 | B2 * | 11/2012 | Geldenhuis et al. | 75/508 |
| 2006/0123949 | A1 | 6/2006 | Kimura et al. | |

FOREIGN PATENT DOCUMENTS

| CN | 101148687 A | 3/2008 |
|---|---|---|
| CN | 100529111 C | 8/2009 |
| CN | 101545027 A | 9/2009 |
| EP | 0265038 A1 | 4/1988 |

(Continued)

*Primary Examiner* — George Wyszomierski
*Assistant Examiner* — Tima M McGuthry Banks
(74) *Attorney, Agent, or Firm* — Hahn, Loeser & Parks LLP; Arland T. Stein

(57) ABSTRACT

A method of desulfurizing steel including steps of forming a slag over a molten metal, drawing a vacuum to less than 5 torr over the slag and molten metal, stirring the molten metal and slag, and deoxidizing and desulfurizing the molten metal and slag to degas the steel reducing at least sulfur, nitrogen, oxygen, and hydrogen contents, and reducing activity of oxygen in the molten metal to less than 30 ppm. The method includes forming a slag composition after degassing the steel comprising CaO between about 50 and 70% by weight, $SiO_2$ between about 20 and 28% by weight, $CaF_2$ between about 5 and 15% by weight, MgO not more than 8% by weight, $Al_2O_3$ not more than 1% by weight, and a combination of FeO+MnO not more than 2% by weight, where the sum of $CaO+CaF_2+SiO_2+MgO$ is at least 85% by weight.

17 Claims, 13 Drawing Sheets

Electric Arc Furnace → Vacuum Tank Degasser → Ladle Metallurgical Furnace

(56) References Cited

FOREIGN PATENT DOCUMENTS

| | | |
|---|---|---|
| EP | 0548868 A2 | 6/1993 |
| EP | 0665295 | 1/1994 |
| JP | H05-230516 A | 9/1993 |
| JP | 2000-178634 | 6/2000 |
| JP | 2001342510 A | 12/2001 |
| JP | 2003-089815 A | 3/2003 |
| WO | 9825717 | 6/1998 |

* cited by examiner

Electric Arc Furnace → Vacuum Tank Degasser → Ladle Metallurgical Furnace

METHOD OF DESULFURIZING STEEL This application claims priority to U.S. patent application Ser. No. 13/007,163 filed Jan. 14, 2011, now abandoned the disclosure of which is incorporated herein by reference.

BACKGROUND AND SUMMARY

Certain commercial steel compositions require relatively low amounts of carbon (less than 0.05%), nitrogen (less than 50 ppm), and sulfur (less than 30 ppm). In the past, methods of producing these low carbon and low sulfur steels used a combination of processes in a steelmaking furnace and a degasser. The prior method involved reducing the carbon levels in the steel composition in the steelmaking furnace, such as an electric arc furnace (EAF), making alloy additions during the tapping process to desulfurize and alloy the steel, and then shipping the steel to the degasser such as a vacuum tank degasser (VTD). This processing route was simple and quite straightforward.

To achieve the steel composition requirements of such commercial grades in the past, steel with very low carbon levels, such as less than 0.025%, was tapped at the steelmaking furnace. The dissolved oxygen levels associated with these low carbon amounts were in the order of 1200 ppm to 1400 ppm in the furnace before tapping. Where the degasser was a distance from the furnace, the steel was tapped at approximately 1700° C. to compensate for temperature losses during transportation to the degasser. During the tapping process, the steel was deoxidized with aluminum and ferrosilicon (FeSi). Lime and aluminum dross were also added to create a fluid, deoxidized, desulfurizing slag. By these additions, the desulfurizing reaction was started in the ladle during shipping to the degasser. At the degasser further additions of aluminum, lime, calcium aluminate and dolomitic lime were made to ensure desired sulfur removal during the degassing cycle.

The prior process had drawbacks, including high refractory wear on the steelmaking furnace. The elevated tapping temperatures and high oxygen content required before tapping the steelmaking furnace had an adverse effect on productivity at the furnaces. The high temperatures and high oxygen conditions enabled high amounts of FeO in the slag at the high temperatures, causing excessive refractory wear on the furnace walls. This led to increased furnace down-times while the furnace refractories were patched with gunite. Also the high FeO content in the slag results in lower efficiency in steelmaking as more iron units are lost in the slag.

The prior process also required the use of low carbon alloys and additives throughout the subsequent processes from the steelmaking furnace to maintain the low carbon level below 0.05% by weight. Low carbon alloying elements, such as low carbon FeMn, were required to provide desired elements without upsetting the final carbon content of the steel. Recently, the price of low carbon ferro-alloys has increased significantly, making this method economically undesirable to produce such low carbon steel. Further, lowering the amount of carbon in the steel composition in the steelmaking furnace required additional decarburization time, which also adversely affected productivity at the steelmaking furnace. Cost was further increased as a result of more silicon and aluminum required to deoxidize the steel composition as a result of the higher oxygen content.

Additionally, in prior decarburizing and desulfurizing processes, aluminum has been the primary deoxidant. In certain applications, aluminum is not desired in the steel product, requiring additional compositions and processes to retain the aluminum in the slag. There remains a need to decrease production costs of low carbon, low nitrogen, and low sulfur steels.

We have found an alternative method of making a steel with low carbon less than 0.05% by weight that avoids the need for aluminum additives, reduces wear on refractories, and increases steelmaking efficiency.

Disclosed is a method of desulfurizing a silicon killed steel including the steps of:
  forming a slag over a molten metal,
  drawing a vacuum to less than 5 torr over the combination of slag and molten metal,
  stirring the molten metal and slag,
  deoxidizing and desulfurizing the molten metal and slag to degas the steel reducing at least sulfur, nitrogen, oxygen, and hydrogen contents, and reducing activity of oxygen in the molten metal to less than 30 ppm, and
  forming a slag composition after degassing the steel comprising:
    CaO between about 50 and 70% by weight,
    $SiO_2$ between about 20 and 28% by weight,
    $CaF_2$ between about 5 and 15% by weight,
    MgO not more than 8% by weight,
    $Al_2O_3$ not more than 1% by weight, and
    a combination of FeO+MnO not more than 2% by weight,
    where the sum of $CaO+CaF_2+SiO_2+MgO$ is at least 85% by weight.

The step of drawing a vacuum may include drawing a vacuum to less than 1 torr.

The stirring step may additionally reduce lead, zinc, bismuth, antimony content in the molten metal composition.

The stirring step may involve bubbling inert gas at a rate between 0.1 and 1.0 SCFM per ton of molten metal in a heat for between 10 and 40 minutes. The stirring step may reduce the sulfur to less than 30 ppm, and alternatively less than 10 ppm, nitrogen to less than 50 ppm, activity of oxygen less than 15 ppm, and hydrogen less than 3 ppm.

Alternatively, a method of desulfurizing a silicon killed steel may include the steps of:
  forming a slag over a molten metal,
  drawing a vacuum to less than 5 torr over the combination of slag and molten metal,
  stirring the molten metal and slag, and
  deoxidizing and desulfurizing the molten metal and slag to degas the steel reducing at least sulfur, nitrogen, oxygen, and hydrogen contents, and reducing activity of oxygen in the molten metal to less than 30 ppm, and
  forming a slag composition after degassing the steel comprising:
    CaO between about 50 and 70% by weight,
    $SiO_2$ between about 20 and 28% by weight,
    $CaF_2$ between about 5 and 15% by weight,
    MgO not more than 8% by weight,
    $Al_2O_3$ not more than 1% by weight,
    $Cr_2O_3$ not more than 15% by weight, and
    a combination of FeO+MnO not more than 2% by weight,
    where the sum of $CaO+CaF_2+SiO_2+MgO+Cr_2O_3$ is at least 85% by weight.

Also disclosed is a method of desulfurizing steel including the steps of:
  (a) preparing a heat of molten steel composition in a steelmaking furnace to a tapping temperature as desired for desulfurization at a vacuum tank degasser,
  (b) tapping open into a ladle the molten steel composition with an oxygen level between about 250 and 1200 ppm, (c) providing a slag forming compound to the ladle to form a slag cover over the molten steel composition in the ladle, (d) transporting the molten steel composition in the ladle to a vacuum tank degasser, (e) decarburizing the molten steel composition at the vacuum tank degasser by drawing a vacuum of between about 0.5 and 300 torr, (f) after decarburizing, drawing a vacuum of less than 5 torr and adding flux components, deoxidizers, and alloying agents forming a slag composition having less than 1% $Al_2O_3$ to the molten steel to deoxidize and desulfurize the steel, and (g) stirring the molten metal and slag composition deoxidizing and desulfurizing the molten metal and slag composition to degas the steel reducing at least sulfur, nitrogen, oxygen, and hydrogen contents, and capable of reducing activity of oxygen to less than 30 ppm.

The step of drawing a vacuum may include drawing a vacuum to less than 1 torr.

The step of decarburizing the molten steel may be between 2 and 10 minutes.

Depending on the final chemistry, the method may further include the step of prior to the step of decarburizing, adding an additional oxygen source.

The step of adding flux components, deoxidizers, and alloying agents may include providing an initial slag composition prior to deoxidizing adapted to provide a slag composition after degassing the steel comprising:

CaO between about 50 and 70% by weight,
$SiO_2$ between about 20 and 28% by weight,
$CaF_2$ between about 5 and 15% by weight,
MgO not more than 8% by weight,
$Al_2O_3$ not more than 1% by weight, and
a combination of FeO+MnO not more than 2%,
where the sum of $CaO+CaF_2+SiO_2+MgO$ is at least 85% by weight.

The step of adding flux components, deoxidizers, and alloying agents may include providing an initial slag composition prior to deoxidizing adapted to provide a slag composition after degassing the steel comprising:

CaO between about 50 and 70% by weight,
$SiO_2$ between about 20 and 28% by weight,
$CaF_2$ between about 5 and 15% by weight,
MgO not more than 8% by weight,
$Al_2O_3$ not more than 1% by weight,
$Cr_2O_3$ not more than 15% by weight, and
a combination of FeO+MnO not more than 2% by weight,
where the sum of $CaO+CaF_2+SiO_2+MgO+Cr_2O_3$ is at least 85% by weight.

DETAILED DESCRIPTION OF THE DISCLOSURE

Figure 1:
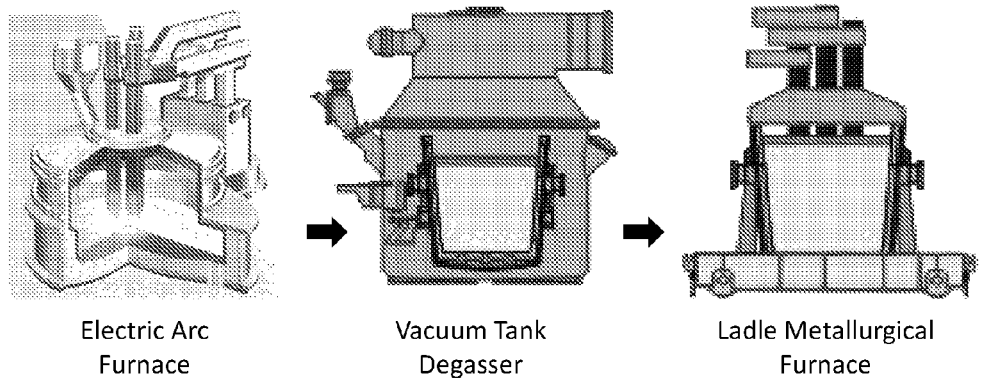
FIG. 1 is a diagrammatical flowchart of processes used in the present method of desulfurizing a silicon killed steel.

In a process for preparing steel for casting, as shown diagrammatically in FIG. 1, the steel typically progresses from an electric arc furnace (EAF) to a vacuum tank degasser (VTD) to a ladle metallurgical furnace (LMF) before casting. The steel grades produced by the presently disclosed method typically have carbon less than about 0.05% by weight. The steel grade also typically has low nitrogen less than about 0.005% by weight and low sulfur less than about 0.003% by weight, or less than about 0.0015% by weight.

A steel melt shop typically has one or more electric arc furnaces, such as a 120 ton (metric ton) EAF equipped with 110 megavolt-ampere (MVA) transformers. Such electric arc furnaces may be between about 30 ton and 400 ton capacity, but are generally for continuous casting between 60 and 120 tons capacity. Each furnace may contain gas injection lances, such as a More brand gas injector system, through which a combination of oxygen and natural gas can be blown into the furnace, as well as a carbon injection pipe. These may be used to inject carbon and oxygen at different ratios throughout the heating of the steel to create a foamy EAF slag. Preparation of a foamy slag has been described in Pretorius, E. B. and R. C. Carlisle, *Foamy Slag Fundamentals and Their Practical Application to Electric Furnace Steelmaking*, ISS-AIME, EF Conference Proceedings, 1998, pp. 275-291. The EAF may also be equipped with a top feed flux system through which lime, dolomite and carbon can be fed to control the slag basicity and viscosity for better slag foaming while melting. The present process may be used with other steelmaking furnaces, such as a basic oxygen furnace.

The molten steel in the heat of an EAF is tapped open when the oxygen content and temperature of the steel composition are within desired parameter ranges. As the EAF may be removed from the VTD, the tapping temperature of the steel composition at the EAF is selected to allow for a temperature decrease during transit from the EAF to the VTD to provide a desired temperature at the VTD for decarburization and nitrogen and sulfur reduction. The steel composition may be tapped open from the furnace into a ladle through an eccentric bottom tap hole (EBT) system, which is typically designed to minimize carry-over slag from the EAF into the ladle during tapping. For example, in a 120 ton capacity EAF, about 95 ton of steel is tapped from the furnace into the ladle.

Figure 2:
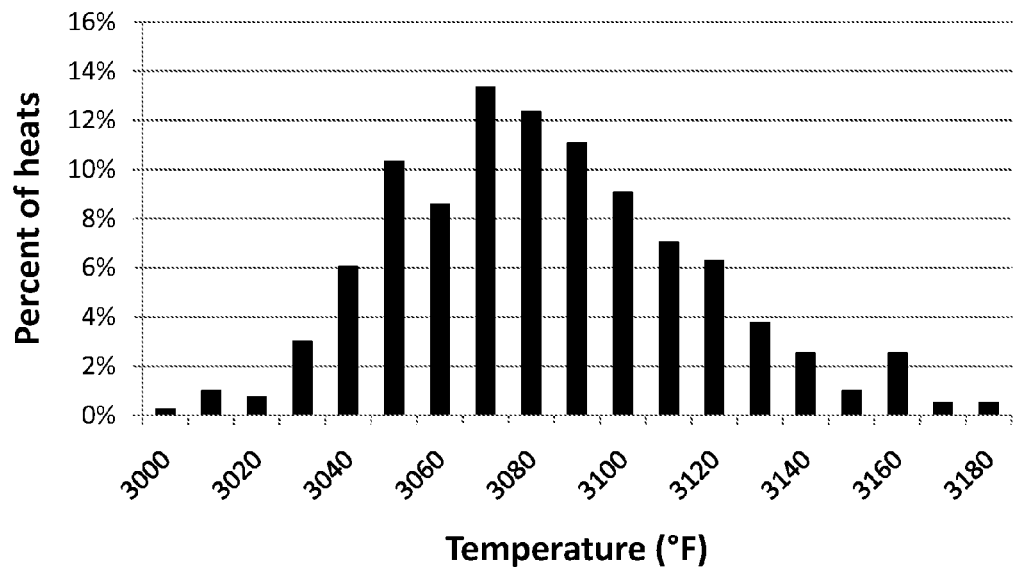
FIG. 2 is a chart showing a distribution of tap temperatures for a plurality of heats.

When the VTD is a distance from the steelmaking furnace, the tap temperature may be between about 3100° F. and 3180° F. (about 1700° C. and 1750° C.) to allow for a temperature decrease during transit from the furnace to the VTD. Alternatively, when the transit time to the VTD is less, the tap temperature may be between about 2900° F. and 3000° F. (about 1590° C. and 1650° C.), or alternatively between about 3000° F. and 3100° F. (about 1650° C. and 1700° C.). FIG. 2 shows a typical distribution of tap temperatures at the EAF. In the example shown in FIG. 2, a majority of tap temperatures are between about 3040° F. and 3120° F. (about 1670° C. and 1715° C.). During the present tapping step, the argon plugs are shut off so that the steel composition may not be stirred. As soon as tapping from the furnace into the ladle is completed, a steel sample may be taken, and an addition of slag forming compound such as lime added to the ladle to cover the steel to reduce heat losses and oxidation during transportation to the VTD. A lid may desirably be placed onto the ladle before its transport to the VTD.

Figure 3:
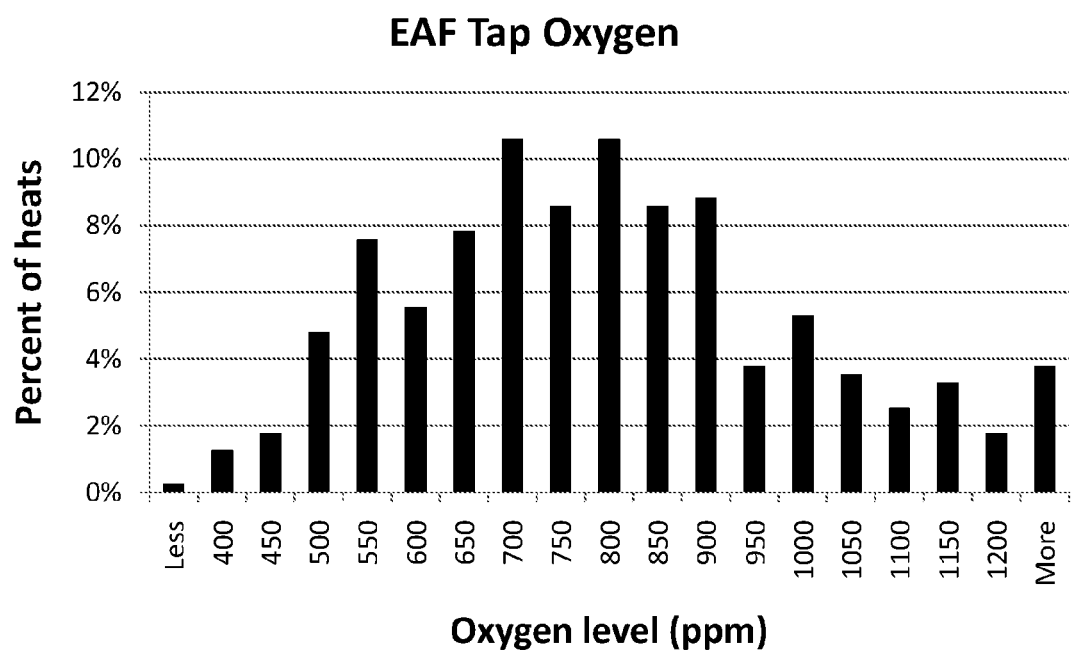
FIG. 3 is a chart showing a distribution of tap oxygen content for a plurality of heats.
Figure 4A:
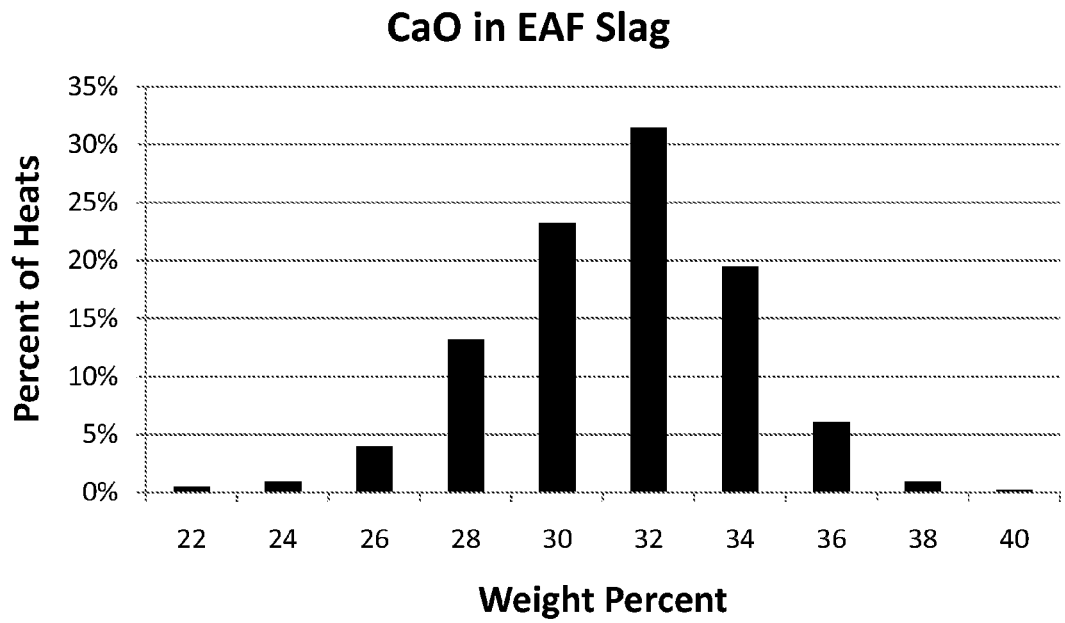
FIG. 4A through 4F are charts each showing a distribution of the amount of a component in a slag for a plurality of heats measured at the EAF.
Figure 4B:
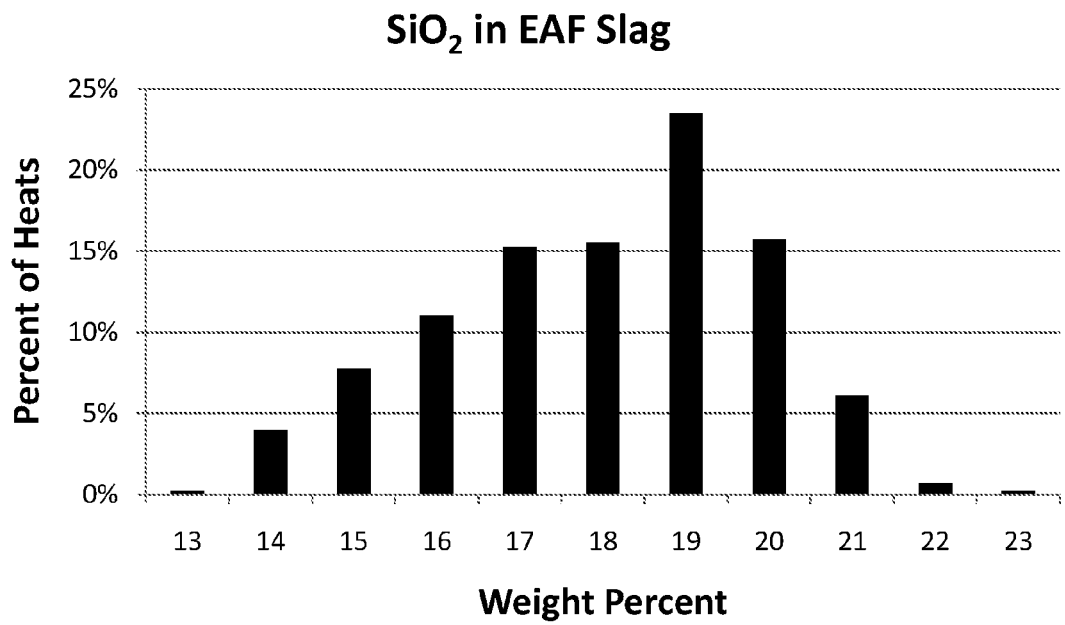
Figure 4C:
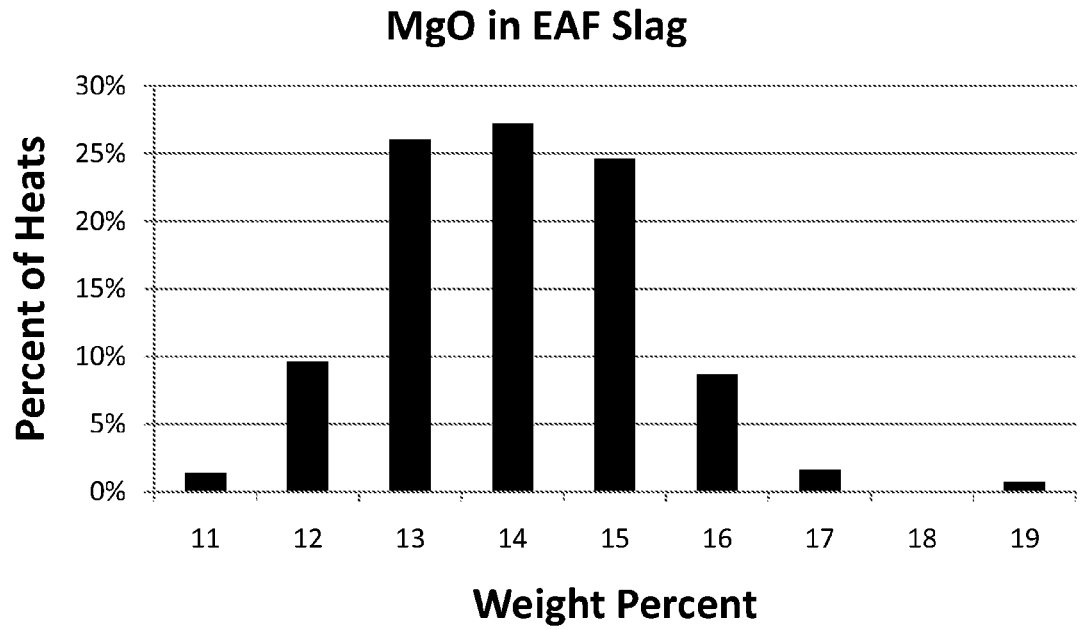
Figure 4D:
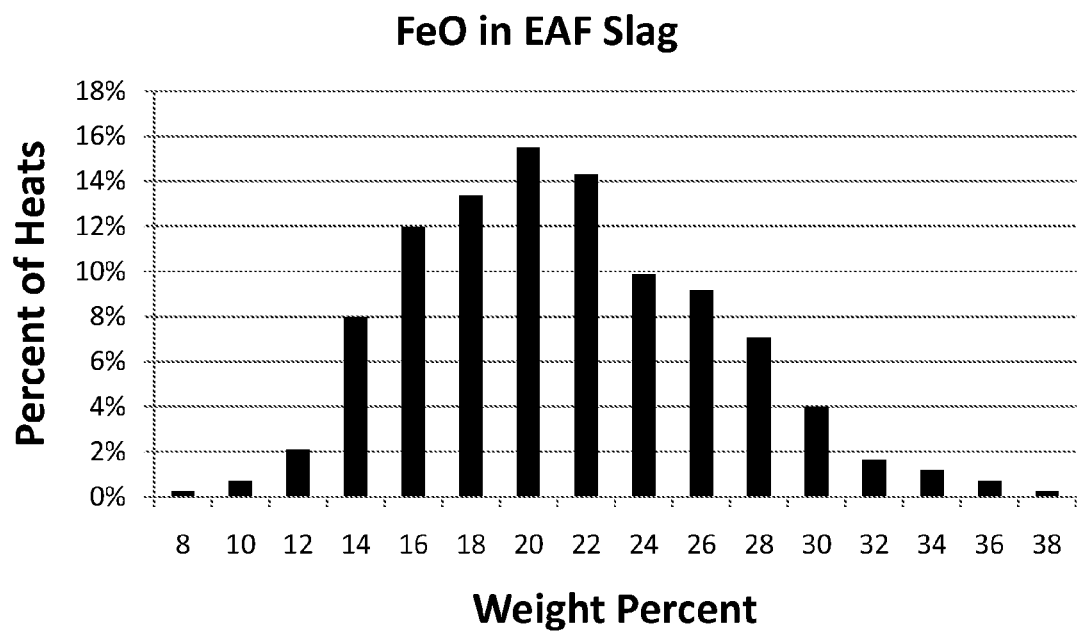
Figure 4E:
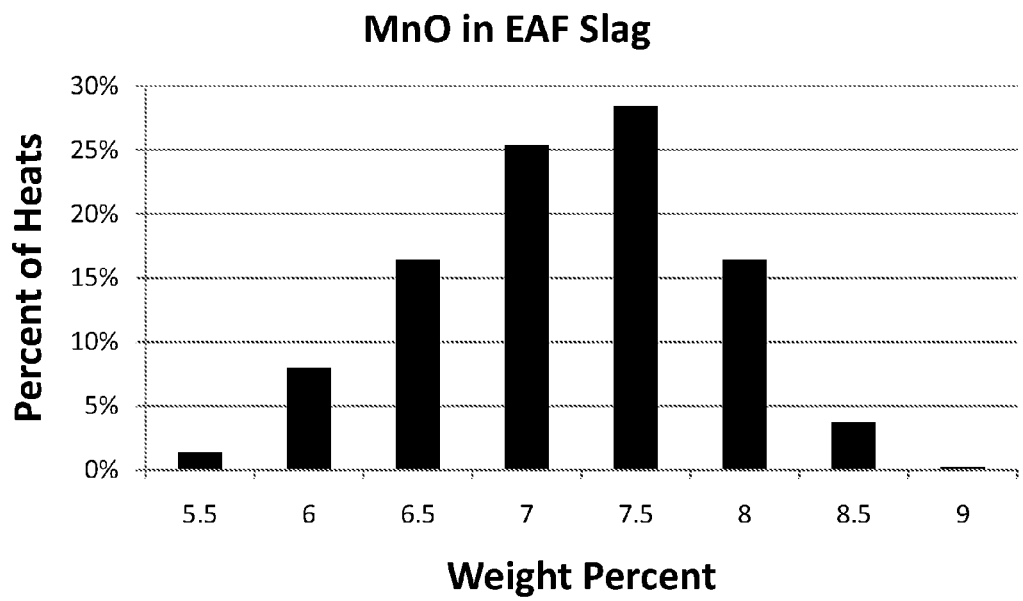
Figure 4F:
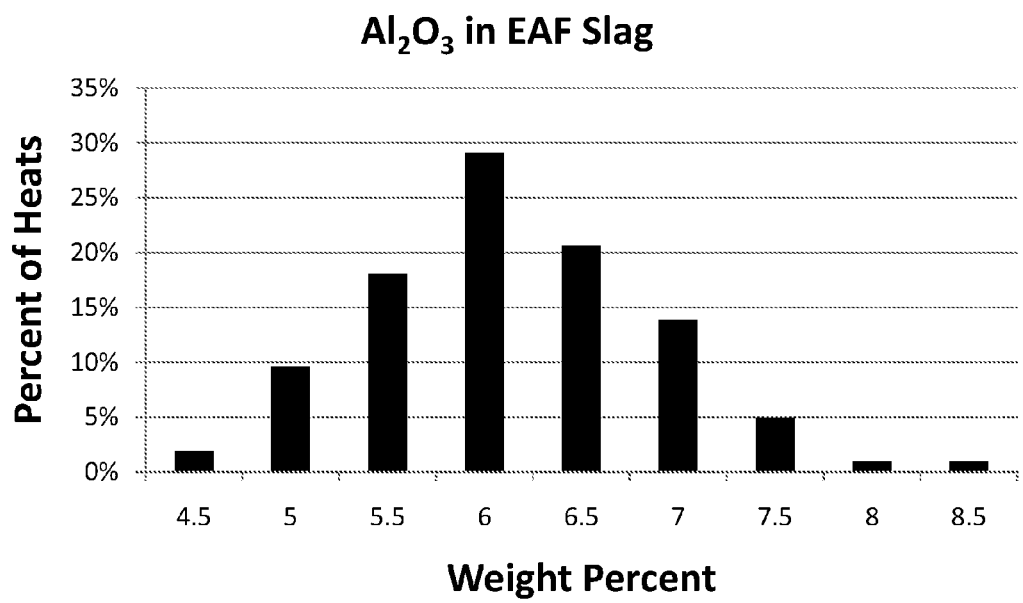
Figure 5A:
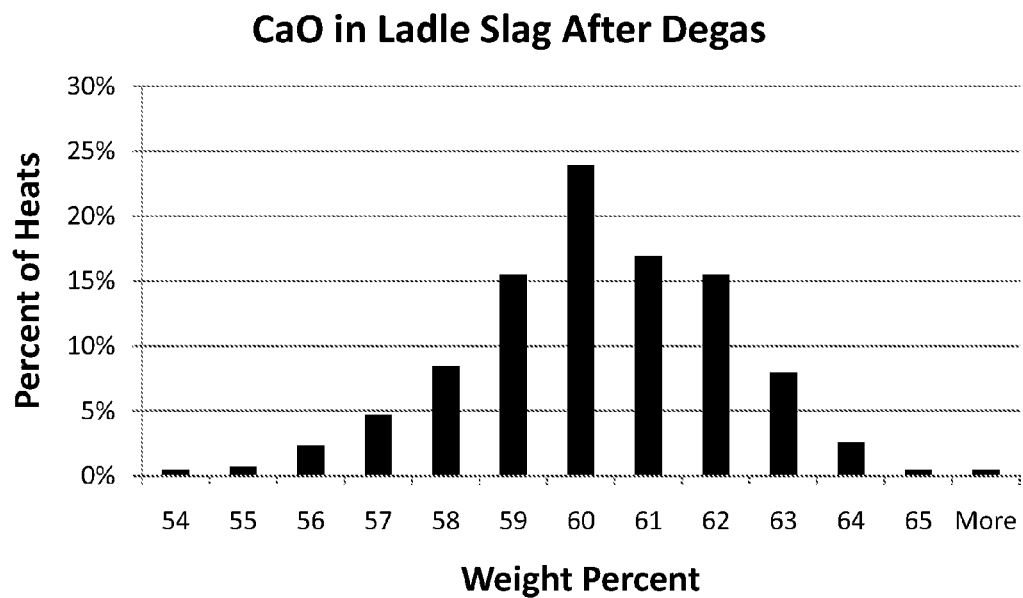
FIG. 5A through 5H are charts each showing a distribution of the amount of a component in a slag for a plurality of heats measured after degassing the molten steel.
Figure 5B:
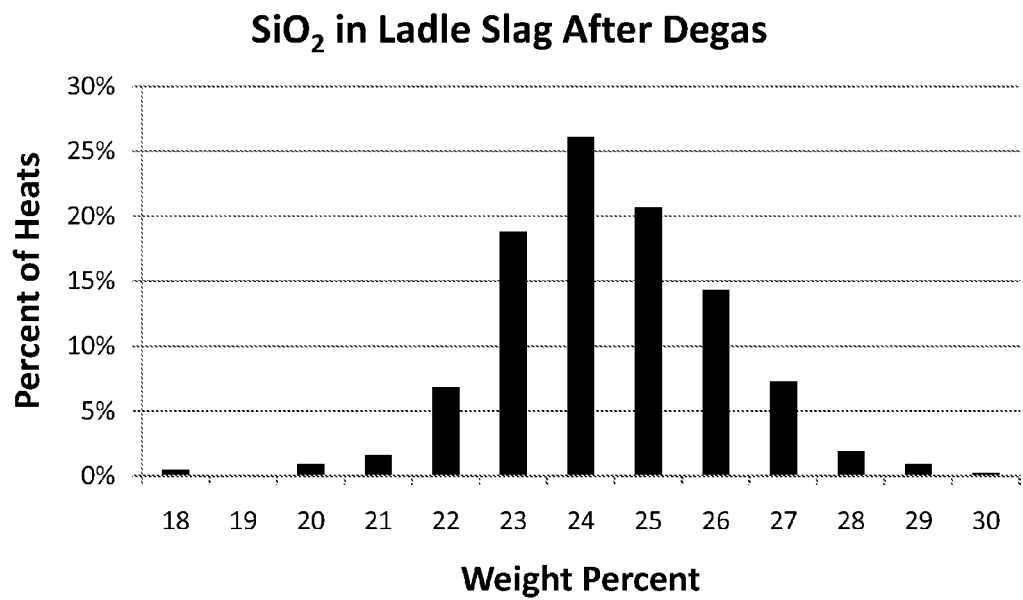
Figure 5C:
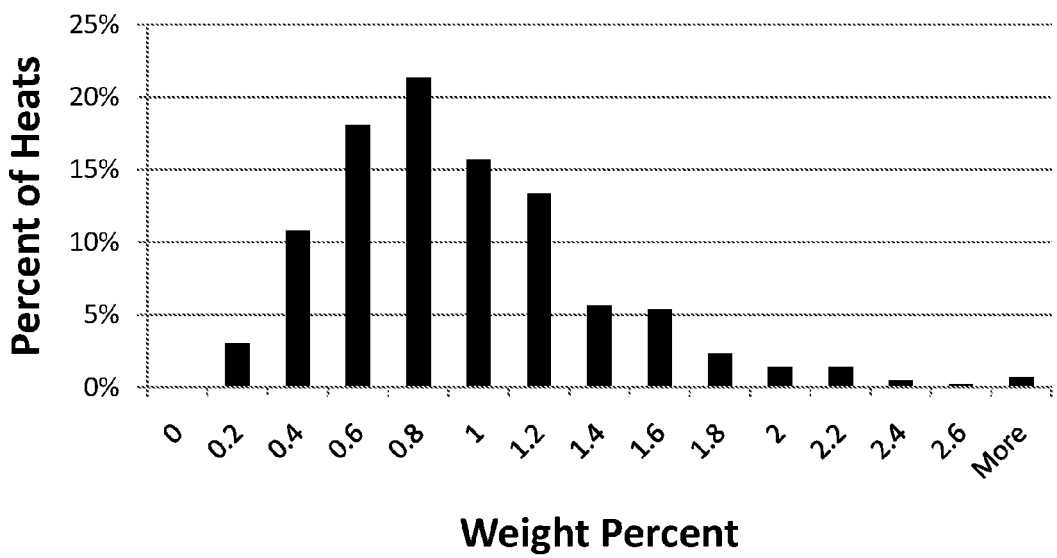
Figure 5D:
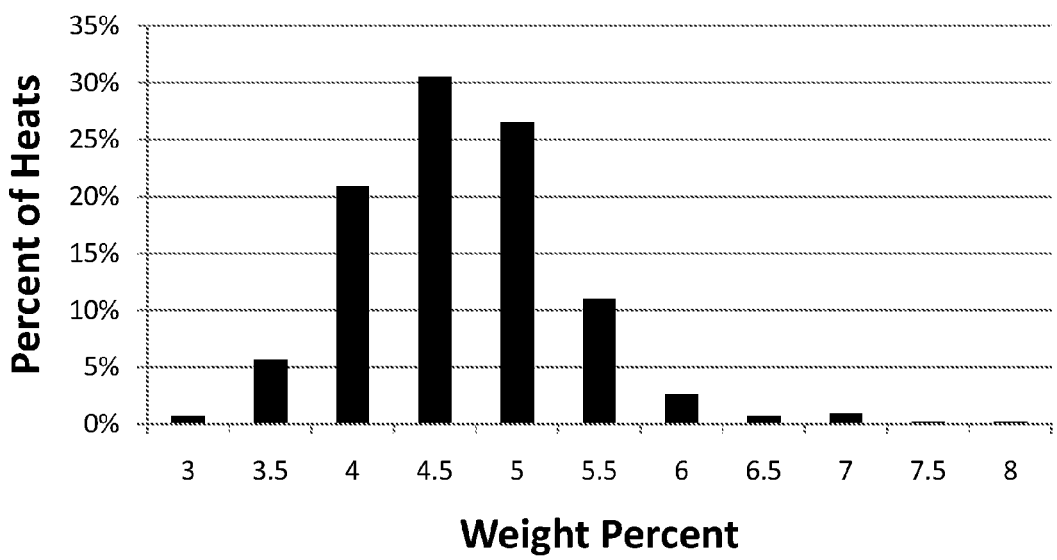
Figure 5E:
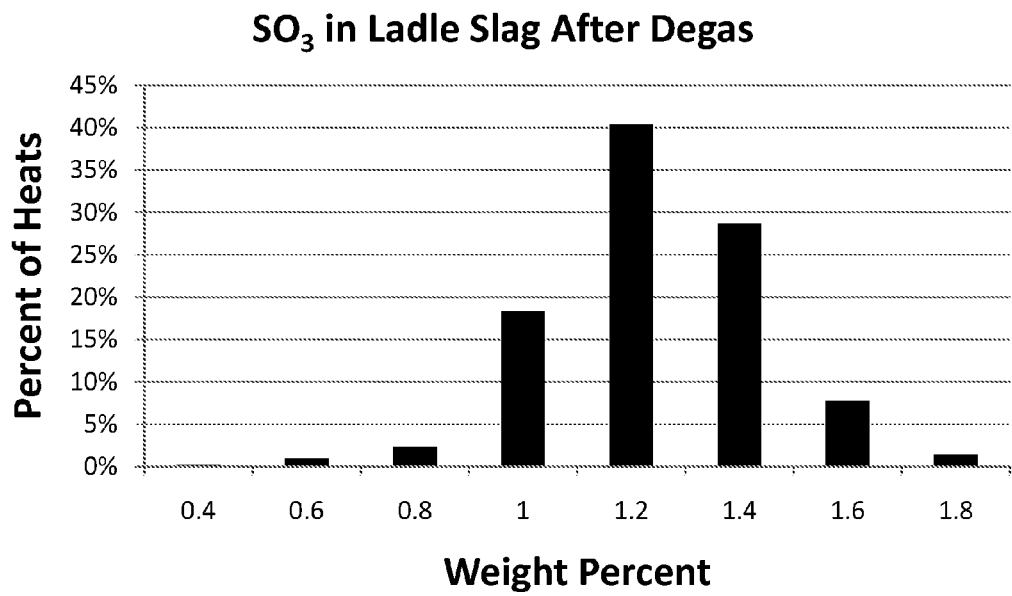
Figure 5F:
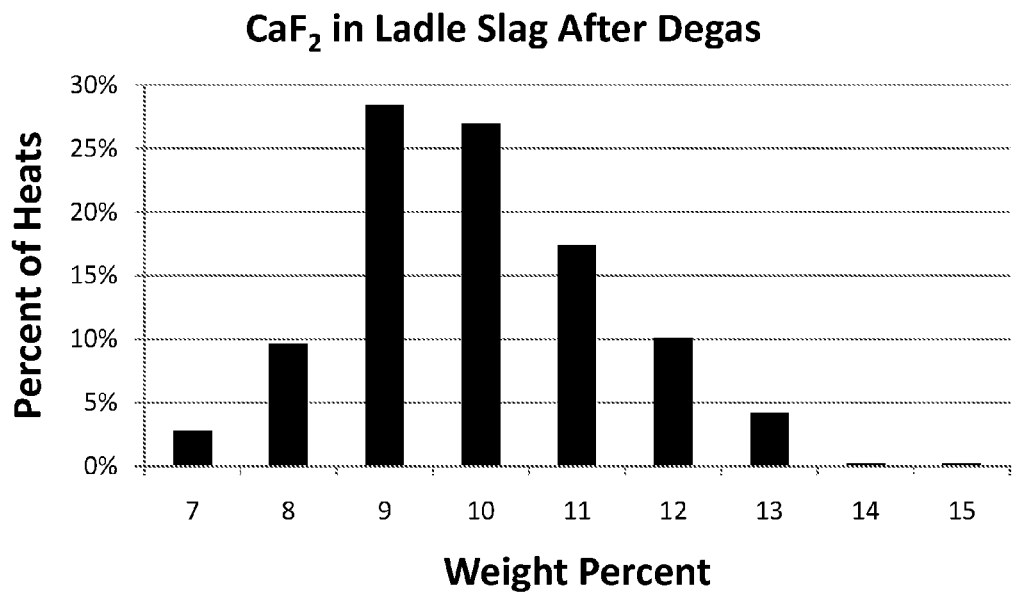
Figure 5G:
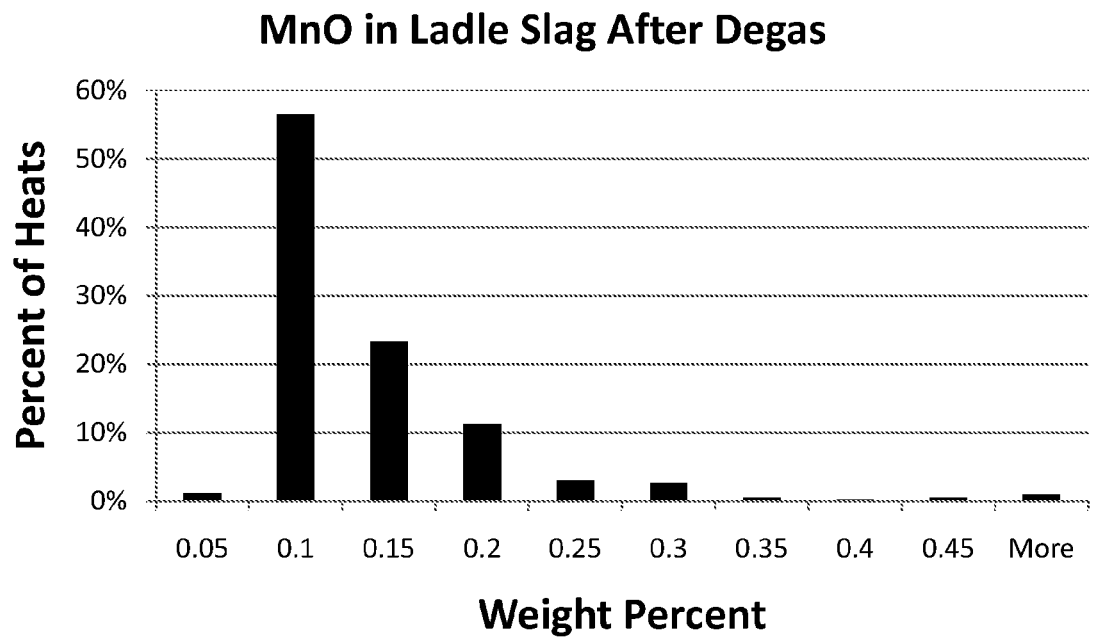
Figure 5H:
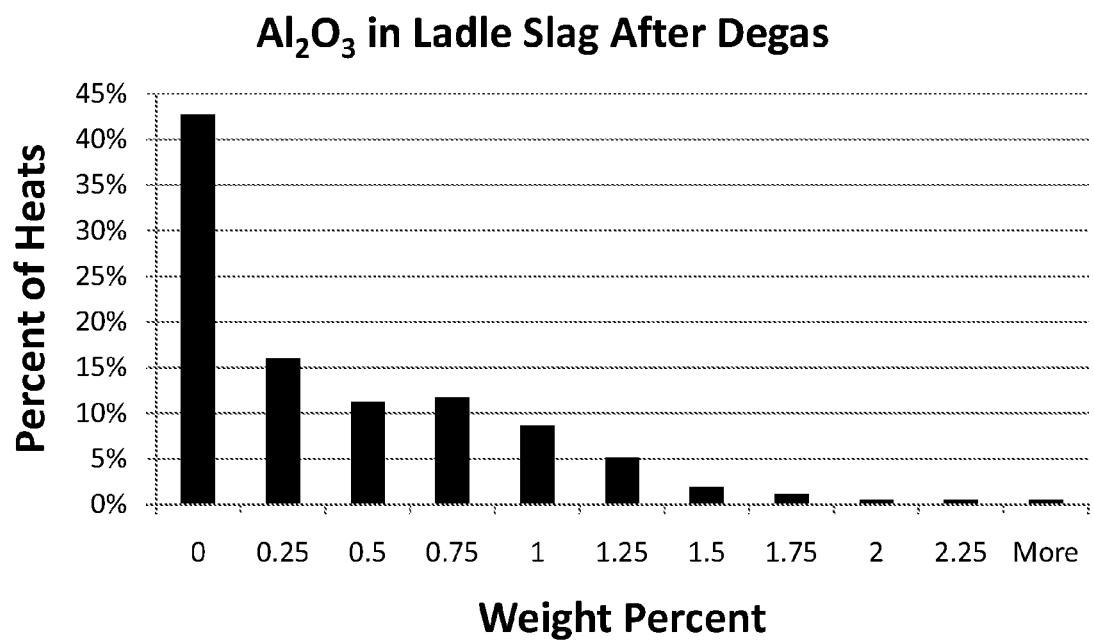
Figure 6A:
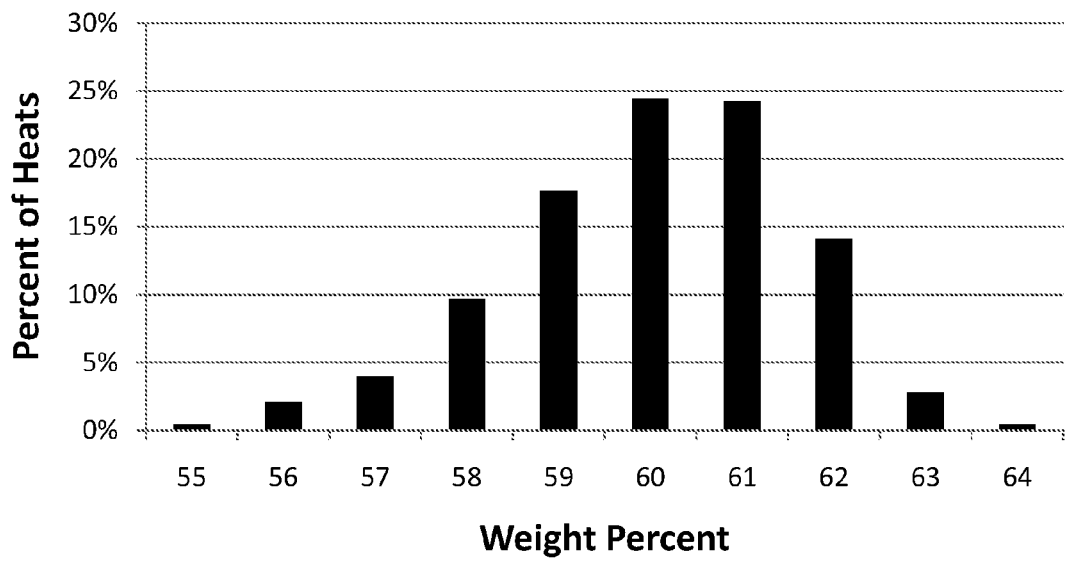
FIG. 6A through 6H are charts each showing a distribution of the amount of a component in a slag for a plurality of heats measured prior to casting.
Figure 6B:
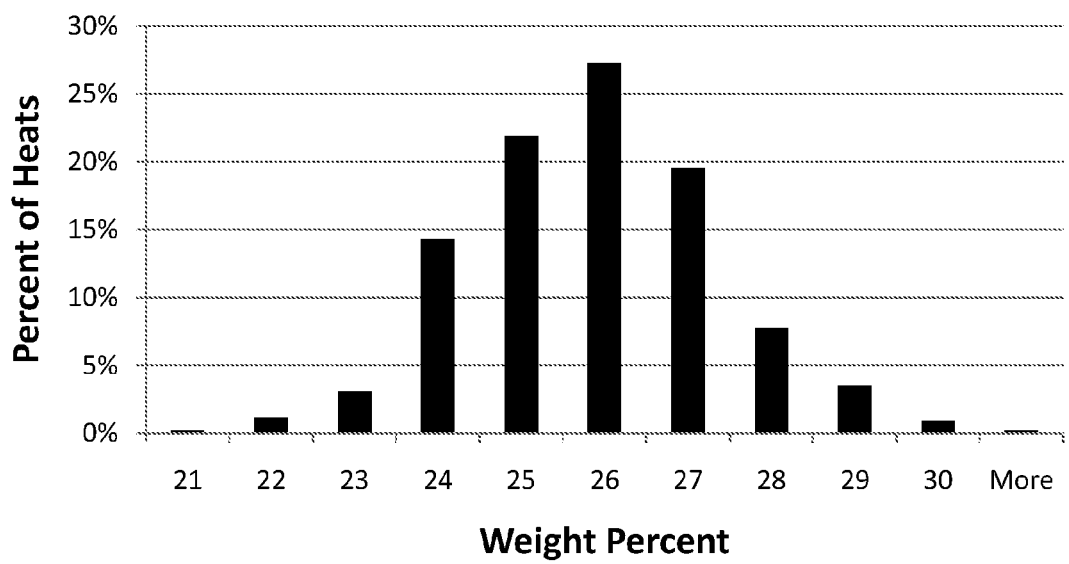
Figure 6C:
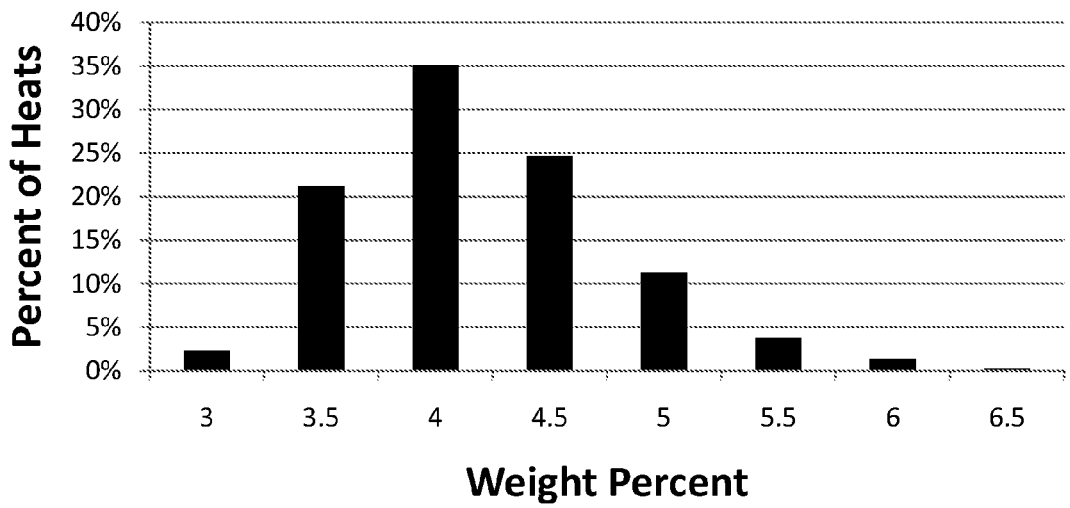
Figure 6D:
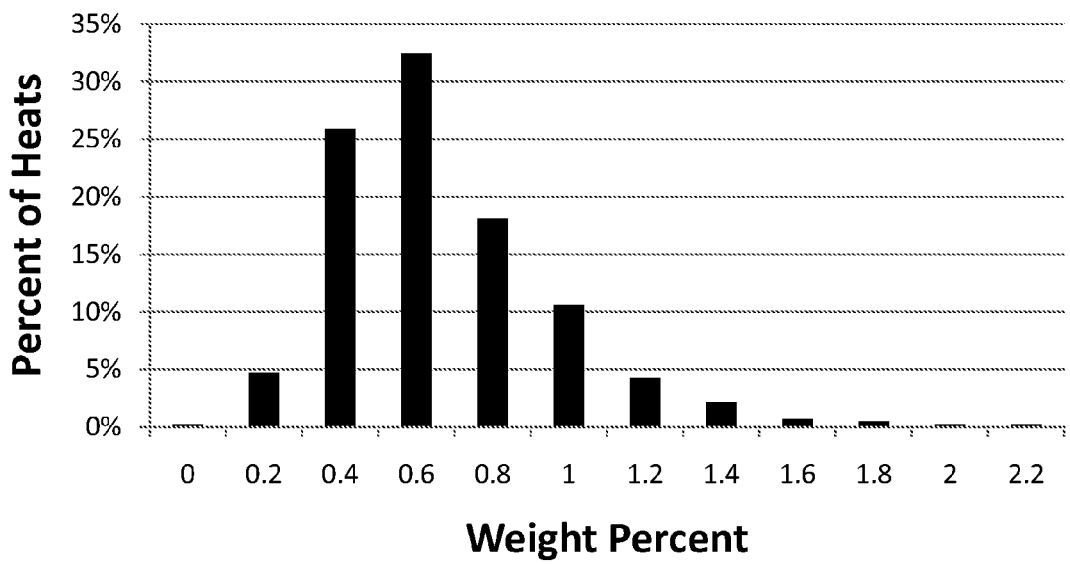
Figure 6E:
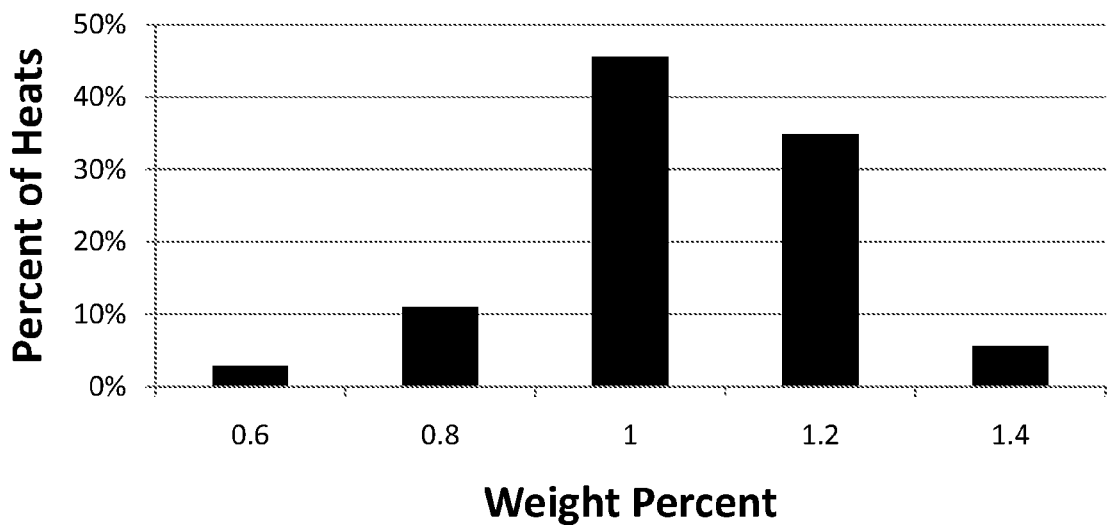
Figure 6F:
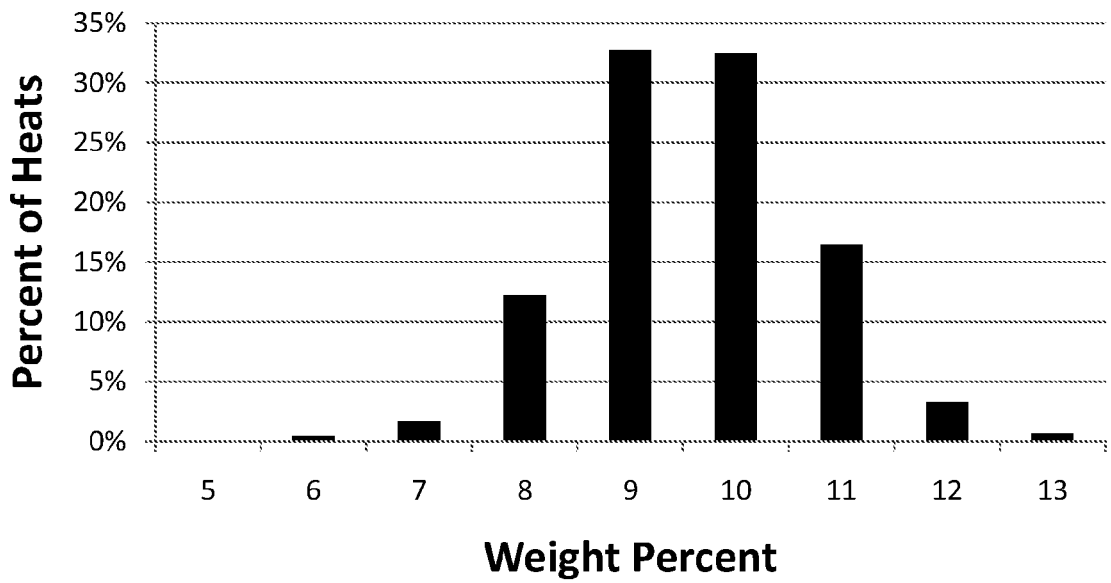
Figure 6G:
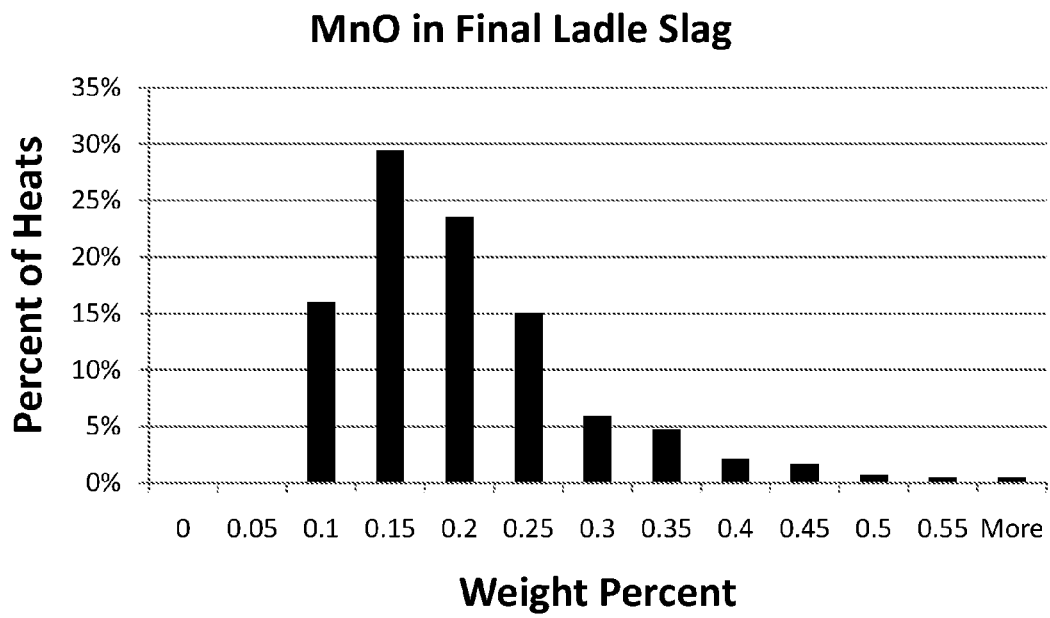
Figure 6H:
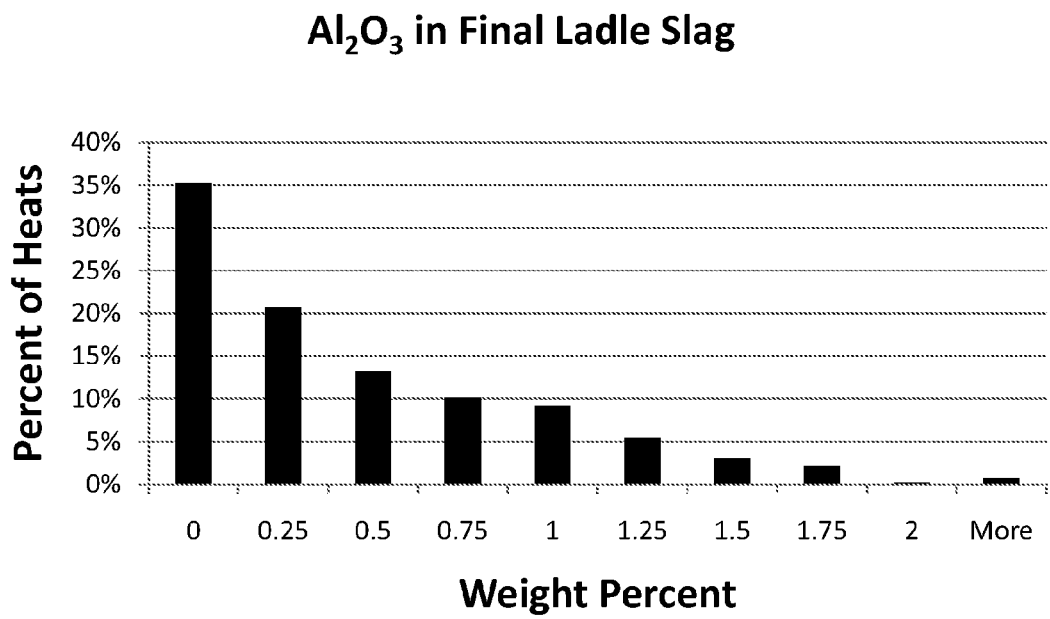

In the present method, decarburization is not completed in the EAF as in the past processes. Instead, in the present method the EAF tap oxygen is lowered with correspondingly higher tap carbon levels. This improved method includes the steps of open tapping at the steelmaking furnace and a subsequent decarburization and desulfurization steps at the VTD. Open tapping (or tapping open) means tapping without an intentional addition of deoxidizers. In the present method, the tap oxygen content of the steel is between about 250 and 1200 ppm, and more desirably between about 700 and 1000 ppm. For tap oxygen levels lower than about 700 ppm, prior to the step of decarburizing, an additional oxygen source may be added to the ladle, such as mill scale. FIG. 3 shows a typical distribution of tap oxygen content at the EAF.

The ladles are typically equipped with two porous plugs capable of introducing argon into the steel composition as desired. The porous plug hook-up may use automated connections through corresponding ladle trunnions. The tap station is also equipped with a measurement system capable of measuring and recording the steel temperature directly after tapping, and may be capable of measuring and recording additional information such as oxygen level in the steel composition. As soon as the tapping process is completed, a slag sample may be taken from the EAF to measure the amount of FeO in the EAF slag. FIG. 4A through 4F show the amount of the measured slag component for a plurality of heats at the EAF.

Prior processes provided lime, calcium aluminate, aluminum, slag deoxidant and ferrosilicon additions to the steel composition during tapping, and the steel composition in the ladle was stirred throughout the tapping process to mix the additions with the steel composition. By contrast, in the present method, the steel composition is desirably not stirred during tapping. Additionally, other than an addition of lime or dolomitic lime to cover the steel in the ladle, no flux additions are typically made during the present tapping step.

In the present method of making steel, the steel composition is tapped open at the furnace, without deoxidizing additions. As discussed below, the tapping open step reduces the ability for desulfurization in the ladle prior to the VTD. In prior processes involving a deoxidant addition to the ladle and stirring the metal and slag to provide some amount of desulfurization before the VTD, the sulfur content of the steel composition was typically reduced from approximately 350 ppm to 160 ppm (0.035% to 0.016% by weight) in the ladle before the VTD step.

In the present method, after the tapping step, the steel composition is transported in a ladle to the VTD for further treatment to reduce carbon, hydrogen and nitrogen content and desulfurize the steel composition. While the process herein is described with reference to a VTD, it is to be understood that the process is not limited thereto. The present process may be adapted to other degassing systems, including: vacuum arc degassing (VAD) and vacuum oxygen decarburization (VOD). The ladle may be transported by a vehicle or an overhead crane. Upon arrival at the VTD, the ladle may be moved via an overhead crane and placed in the VTD tank.

Once in the VTD porous plug connections may be made, the plugs opened and argon introduced through the porous plugs in the steel composition in the ladle using argon gas at flow rates typically of less than 1 m$^3$/min, i.e. between about 10 and 35 SCFM, but may be up to 2.3 m$^3$/min (about 80 SCFM) for certain applications. The flow of argon causes an initial stirring to break-up and liquefy the slag, and make the steel temperature more even through the ladle. When the slag becomes broken-up and/or liquefied, the porous plugs are turned off, and measurements of the temperature and amount of oxygen are recorded. These measurements at the VTD and the measurements at the furnace recorded before and/or after tapping may be used to determine the alloy and flux additions to the steel composition, and used to determine the amount of time for the decarburization step at the VTD.

In the present method of making steel with carbon less than 0.05% by weight the decarburization step is performed at the VTD followed by a deoxidation step, a slag building step, a desulfurizing step, and a gas removal step at the VTD.

The decarburization process may begin after the argon stirring is turned off and measurements of the temperature and amount of oxygen are recorded in the steel composition at the VTD. The lid is placed onto the ladle, and the tank evacuation begins. As a vacuum is drawn on the ladle, gases are removed from the steel composition in the ladle, including carbon monoxide (CO), hydrogen, and nitrogen. As the vapor pressure of CO is reduced above the steel composition, additional carbon and oxygen react to form CO, which is drawn from the steel composition. We have found that the reaction of carbon and oxygen provides sufficient stirring action and no argon stirring is required. However, for certain applications some argon stirring may be desired. Vacuum levels of less than 300 torr (about 400 millibars) are used during decarburization. At the beginning of decarburization, the vacuum level may be a desired value, such as between about 150 and 300 torr (about 200 and 400 millibars), and then as decarburization progresses the vacuum may be pumped down to about 0.5 torr or higher or lower as desired for the decarburizing activity in the molten steel. In one example, the decarburization begins at about 200 torr (about 270 millibars for about 4 minutes, then is pumped down to about 0.5 torr, or lower, for the remainder of the decarburization.

After decarburization in the VTD, desired additives are added to the steel composition for deoxidization and desulfurization. Desired combinations of lime, dolomitic lime, silicomanganese, ferrosilicomanganese (FeSiMn) and other fluxes are also added to form a desulfurizing slag. Additives are selected to control and restrict the amount of aluminum in the slag and in the steel. Additions are added to the steel composition in the ladle through a pressure equalization hopper at desired times in the process. The addition of deoxidizing additives under vacuum can be reactive. Prior to adding the deoxidizing additives, the vacuum level may be adjusted to between about 20 and 150 torr (about 25 and 200 millibar), as desired for the additive composition.

As the desired additions are fed from the hopper, the tank lid is placed into its operating position. The porous plugs are turned on and the tank evacuation begins. The vacuum level is pumped down to less than about 5 torr for desulfurization and degassing, reducing at least sulfur, nitrogen, oxygen, and hydrogen contents. Alternatively, desulfurization and degassing may be at vacuum levels of 0.2 to 2 torr. The pump down time to 2 torr is typically less than 7 minutes, depending in part on the thermal history of the tank. The time to complete the desulfurization and degassing step may be about 20 minutes.

During the desulfurization and degassing, stirring may be applied to the ladle. The stirring step includes bubbling inert gas at a rate between 0.1 and 1.0 SCFM per ton of molten metal in a heat for between 10 and 40 minutes. The stirring step may reduce the sulfur in the molten steel to less than 30 ppm, and alternatively less than 10 ppm, nitrogen to less than 50 ppm, activity of oxygen less than 15 ppm, and hydrogen less than 3 ppm. The activity of oxygen of the molten steel measured after degassing is lower than prior desulfurization methods for silicon killed steel.

As an example, FIGS. 5A through 5H show the amount of the measured slag component for a plurality of heats following the desulfurization and degassing step.

Then, the ladle may be transported to a Ladle Metallurgical Furnace (LMF) for further alloying and heating to the required casting temperatures. At the LMF, further slag conditioners may be provided to reduce transfer of sulfur back to the steel during oxygen blow. Calcium may be added to kill the slag prior to oxygen blow.

In the LMF, after desired alloying elements are added and slag conditioned, oxygen may be added to the molten steel as desired for the desired steel properties. In one application, oxygen is added to provide an active oxygen level of up to 70 ppm.

Oxygen may be added to the molten steel by oxygen gas injection through a lance. Alternatively, oxygen gas may be added to the steel through one or more porous plugs. In this alternative, the oxygen may be added in a mixture with argon or other inert gas through the porous plug. In yet another alternative, oxygen may be added to the molten steel by the addition of metal oxides such as iron oxides, manganese oxides, molybdenum oxides, or other oxides, or combinations thereof as desired for the steel composition. In one application, the oxides may be provided by oxide powder in a cored wire fed into the molten steel using a typical wire feeder known in the art. In this application, the oxides may alternatively be injected through a lance. A carrier gas, such as argon, may be provided with the oxides through the lance for delivering the powdered oxides through the lance. Injecting oxides using a cored wire delivery may be useful for applications requiring smaller amounts of oxygen addition, whereas injection of oxides through a lance may enable greater oxide additions.

Following the desulfurization and degassing step, the slag composition includes CaO between about 50 and 70% by weight, $SiO_2$ between about 20 and 28% by weight, $CaF_2$ between about 5 and 15% by weight, MgO not more than 8% by weight, $Al_2O_3$ not more than 1% by weight, and a combination of FeO+MnO not more than 2% by weight, where the sum of $CaO+CaF_2+SiO_2+MgO$ is at least 85% of the slag composition by weight. The slag composition may include $SO_3$ less than 4.0%. The present slag composition is typically a liquid under vacuum. As an example, FIGS. 6A through 6H show the amount of the measured slag component for a plurality of heats after processing in the LMF.

In the present slag composition, while a limited amount of aluminum is tolerated, not more than 1% $Al_2O_3$ by weight, for most applications of the present slag composition, there is no purposeful addition of aluminum. The aluminum content in the steel is less than 0.01% by weight, and may be less than 0.002% by weight. The ratio of manganese to silicon in the steel may be between about 3.5 and 6. The ratio of manganese to sulfur is greater than 200. In addition, the molten steel has an activity of oxygen between 15 and 70 ppm.

While the invention has been illustrated and described in detail in the figures and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of desulfurizing a silicon killed steel comprising the steps of:
   forming a slag over a molten metal,
   drawing a vacuum to less than 5 torr over the combination of slag and molten metal,
   stirring the molten metal and slag,
   deoxidizing and desulfurizing the molten metal and slag to degas the steel reducing at least sulfur, nitrogen, oxygen, and hydrogen contents, and reducing activity of oxygen in the molten metal to less than 30 ppm, and
   forming a slag composition after degassing the steel comprising:
     CaO between about 50 and 70% by weight,
     $SiO_2$ between about 20 and 28% by weight,
     $CaF_2$ between about 5 and 15% by weight,
     MgO not more than 8% by weight,
     $Al_2O_3$ not more than 1% by weight, and
     a combination of FeO+MnO not more than 2% by weight,
     where the sum of $CaO+CaF_2+SiO_2+MgO$ is at least 85% by weight.

2. The method of desulfurizing steel of claim 1, where the step of drawing a vacuum includes drawing a vacuum to less than 1 torr.

3. The method of desulfurizing steel of claim 1, where the stirring step additionally reduces lead, zinc, bismuth, and antimony content in the molten metal composition.

4. The method of desulfurizing steel of claim 1, where the stifling step involves bubbling inert gas at a rate between 0.1 and 1.0 SCFM per ton of molten metal in a heat for between 10 and 40 minutes.

5. The method of desulfurizing steel of claim 1, where the stifling step reduces the sulfur to less than 30 ppm, nitrogen to less than 50 ppm, activity of oxygen less than 15 ppm, and hydrogen less than 3 ppm.

6. A method of desulfurizing a silicon killed steel comprising the steps of:
   forming a slag composition over a molten metal;
   drawing a vacuum to less than 5 torr over the combination of slag and molten metal,
   stirring the molten metal and slag,
   deoxidizing and desulfurizing the molten metal and slag to degas the steel reducing at least sulfur, nitrogen, oxygen, and hydrogen contents, and reducing activity of oxygen in the molten metal to less than 30 ppm, and
   forming a slag composition after degassing the steel comprising
     CaO between about 50 and 70% by weight,
     $SiO_2$ between about 20 and 28% by weight,
     $CaF_2$ between about 5 and 15% by weight,
     MgO not more than 8% by weight,
     $Al_2O_3$ not more than 1% by weight,
     $Cr_2O_3$ not more than 15% by weight, and
     a combination of FeO+MnO not more than 2% by weight,
     where the sum of $CaO+CaF_2+SiO_2+MgO+Cr_2O_3$ is at least 85% by weight.

7. The method of desulfurizing steel of claim 6, where the step of drawing a vacuum includes drawing a vacuum to less than 1 torr.

8. The method of desulfurizing steel of claim 6, where the stirring step additionally reduces lead, zinc, bismuth, and antimony content in the molten metal composition.

9. The method of desulfurizing steel of claim 6, where the stifling step involves bubbling inert gas at a rate between 0.1 and 1.0 SCFM per ton of molten metal in a heat for between 10 and 40 minutes.

10. The method of desulfurizing steel of claim 6, where the stifling step reduces the sulfur to less than 30 ppm, nitrogen to less than 50 ppm, activity of oxygen less than 15 ppm, and hydrogen less than 3 ppm.

11. A method of desulfurizing steel comprising the steps of:
   (a) preparing a heat of molten steel composition in a steel-making furnace to a tapping temperature as desired for desulfurization at a vacuum tank degasser,
   (b) tapping open into a ladle the molten steel composition with an oxygen level between about 250 and 1200 ppm,
   (c) providing a slag forming compound to the ladle to form a slag cover over the molten steel composition in the ladle,
   (d) transporting the molten steel composition in the ladle to a vacuum tank degasser,
   (e) decarburizing the molten steel composition at the vacuum tank degasser by drawing a vacuum of between about 0.5 and 300 torr,
   (f) after decarburizing, drawing a vacuum of less than 5 torr and adding flux components, deoxidizers, and alloying agents forming a slag composition having less than 1% $Al_2O_3$ to the molten steel to deoxidize and desulfurize the steel, and
   (g) stirring the molten metal and slag composition deoxidizing and desulfurizing the molten metal and slag composition to degas the steel reducing at least sulfur, nitrogen, oxygen, and hydrogen contents, and reducing the activity of oxygen to less than 30 ppm.

12. The method of desulfurizing steel as claimed in claim 11, where the step of drawing a vacuum includes drawing a vacuum to less than 0.5 torr.

13. The method of desulfurizing steel as claimed in claim 11, where the step of decarburizing the molten steel is between 2 and 10 minutes.

14. The method of desulfurizing steel as claimed in claim 11, depending on a final chemistry, further comprising the step of:
   prior to the step of decarburizing, adding an additional oxygen source.

15. The method of desulfurizing steel as claimed in claim 14, where the additional oxygen source is selected from the group consisting of oxygen gas, metal oxides, and a combination thereof.

16. The method of desulfurizing steel as claimed in claim 11, where the step of adding flux components, deoxidizers, and alloying agents includes:
   providing an initial slag composition prior to deoxidizing adapted to provide a slag composition after degassing the steel comprising:
   CaO between about 50 and 70% by weight,
   $CaF_2$ between about 5 and 15% by weight,
   $SiO_2$ between about 20 and 28% by weight,
   MgO not more than 8% by weight,
   $Al_2O_3$ not more than 1% by weight, and
   a combination of FeO+MnO not more than 2%,
   where the sum of $CaO+CaF_2+SiO_2+MgO$ is at least 85% by weight.

17. The method of desulfurizing steel as claimed in claim 11, where the step of adding flux components, deoxidizers, and alloying agents includes:
   providing an initial slag composition prior to deoxidizing adapted to provide a slag composition after degassing the steel comprising:
   CaO between about 50 and 70% by weight,
   $CaF_2$ between about 5 and 15% by weight,
   $SiO_2$ between about 20 and 28% by weight,
   MgO not more than 8% by weight,
   $Al_2O_3$ not more than 1% by weight,
   $Cr_2O_3$ not more than 15% by weight, and
   a combination of FeO+MnO not more than 2% by weight,
   where the sum of $CaO+CaF_2+SiO_2+MgO+Cr_2O_3$ is at least 85% by weight.

* * * * *